United States Patent Office 3,293,180
Patented Dec. 20, 1966

3,293,180
GREASE COMPOSITION AND PROCESS
THEREFOR
Arthur E. Axworthy, Concord, Calif., assignor to Shell Oil Company, New York, N.Y., a corporation of Delaware
No Drawing. Filed Apr. 30, 1964, Ser. No. 363,987
10 Claims. (Cl. 252—28)

This invention relates to new lubricant compositions. More particularly, it relates to new grease compositions having outstanding thermal stability. This invention is particularly concerned with the production of greases especially useful not only at ordinary temperatures but also at extremely high operating temperatures and which are, at the same time, resistant to disintegration in the presence of water.

Only a few lubricating greases are satisfactory for extended operation at temperatures above 300° F. Furthermore, the useful lubricating life of most greases is considerably shortened by high-temperature operation. However, several approaches have been employed in an attempt to bring forth a grease which can be used at extremely high temperatures. For example, sodium octadecyl terephthalate-thickened greases containing appropriate oils have been reported as being suitable in some instances at 500–600° F. Clay greases have also been employed extensively. While the problem of the hydrophilic character of clay thickening agents has largely been solved by waterproofing the clay with various surfactants and resins, the use of such grease at extremely high temperatures has to some extent been limited by the thermal stability of the clay waterproofant and the lubricating base oil. Substituted urea grease as described in U.S. Patents 2,710,839–840 has been found to provide good bearing performance at temperatures as high as 450° F. when suitably inhibited and containing appropriate base oils. In addition, certain organic dyestuffs have been found to give thermally stable gel structures when incorporated in oils. Among these are phthalocyanine pigments (particularly copper phthalocyanine) as described by Merker and Singleterry, U.S. Patent 2,597,018 and indanthrenes as described by Armstrong and Woods in U.S. Patent 2,848,417.

In the case of each of the foregoing discussed types of extreme high-temperature grease, the grease is formed by addition of the thickening agent to the lubricating base oil. That is, the oil is suspended or thickened by, but not truly homogeneous with the thickening agent. This is, of course, especially true of the clay-thickened greases. However, a new extremely high-temperature clay grease has been discovered which is not merely a lubricating base oil physically thickened with clay, but which is an actual reaction product of the clay, the lubricating base oil, and a metal having an atomic number of from 26 through 29. More particularly, the improved grease composition of the invention is the thermal reaction product of a polysiloxane oil, a sulfate of a metal having an atomic number of 26–29, and clay.

The clays to be used in the process of the invention are those having a substantial base exchange capacity, preferably between about 60 and 100 milliequivalents of exchangeable base per 100 grams of clay. These include particularly the montmorillonites, especially the sodium, potassium, lithium and other bentonites such as Wyoming bentonite, magnesium bentonite (hectorite) and saponite. The clays are preferably treated to remove the substantial amount of gangue which is normally associated therewith. This can be done by dispersal of the crude clay in water and allowing the product to separate into fractions which may be separated from one another either by gravitational means or more preferably by high-speed centrifuging. The clay forms a hydrous sol (hydrosol) with water, a preferred concentration being 1–5% by weight of clay in order to have a system which is relatively fluid and easy to transport, such as by pumping and the like.

In order to prepare the clay in a more suitable manner for full reception of the waterproofing compound, the clay while in hydrosol form may be treated with a mineral acid, preferably a phosphorus acid such as phosphoric acid in an amount at least equal to the basic exchange capacity of the clay. When utilizing the phosphoric acid, this will ordinarily be in an amount between about 4 and about 12% by weight based on the clay.

The colloidal nature of clay is such that it is an effective thickening agent only when the particles are in a swollen or expanded state. Though the clay is expanded when in the form of an aqueous slurry or hydrosol, it is necessary that it remain expanded in the presence of the coreactants after removal of the water. To accomplish this isopropyl alcohol is added to the clay slurry in an amount equivalent to at least 7 parts by weight alcohol per weight of water and the polysiloxane oil reactant is added before removal of water and alcohol from the clay is completed.

The polysiloxane oils which can be used with this invention are the methyl-phenyl silicone fluids of lubricating oil viscosity which will generally be of the following types:

Methyl-phenyl fluids

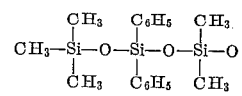

and/or

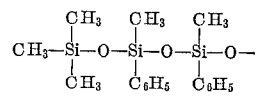

The above types of methyl-phenyl silicone fluids, in addition to being the most thermally stable, are also readily available in commercial quantities.

The unique high-temperature grease of the invention is prepared by the following procedure:

(1) To an aqueous slurry (hydrosol) of clay is admixed a sulfate of a metal having an atomic number of 26–29, isopropyl alcohol in an amount equal to at least seven times the weight of the water contained in the slurry and a methyl-phenyl polysiloxane oil;

(2) The admixture is heated to a temperature of at least 212° F., and preferably at least 250° F., for a period such that essentially all the water and isopropyl alcohol are removed therefrom by evaporation;

(3) The dehydrated admixture is then reacted by heat treatment at a temperature of 400–550° F. for a period of at least one hour; and (4) The reaction mixture is cooled and milled to form a grease.

The process and composition of the invention are illustrated by the following examples:

EXAMPLE I

A grease composition in accordance with the invention was prepared by the following procedure:

An aqueous solution of 1.2 grams of copper sulfate was added to 800 grams of a 2% by wt. slurry of Hectorite clay in water at 160° F. and well mixed. Two gallons of isopropyl alcohol were admixed with the heated slurry and the admixture was boiled gently to remove greater than 50% by weight of the alcohol and water. A DC-550 silicone oil (382.8 grams) was then added to and mixed with the partially dehydrated slurry and the oil-containing mixure was dried, with agitation, at 270° F., and, after essentially complete removal of all the water and alcohol, heated at 450° F. for a period of three hours. The resultant product, which was very dark brown in color, was milled three times to form a stable grease structure. The relative amounts of the reactive ingredients of the grease were as follows:

| | Percent by wt. |
|---|---|
| Clay | 4.0 |
| $CuSO_4$ | 0.3 |
| Silicone oil | 95.7 |

However, during the high-temperature heating or "baking" step, at least 10% by weight of the silicone (polysiloxane) was volatilized by decomposition and reaction in the presence of the clay and copper sulfate. Thus the relative amounts of clay and sulfate are somewhat higher in the finished grease.

As is implied above, the heat treatment and reaction of the clay, polysiloxane oil and metal sulfate is accompanied by the evolution of vapors from reaction of the polysiloxane oil. In general, from 10-30 by weight of oil is volatilized in this manner. Concomitantly, the reaction mixture turns to a dark brown or black color.

Because of the relatively high thermal stability of silicone fluids, the reaction must be carried out at a temperature of at least 400° F. and preferably at least 450° F. On the other hand, it has been found if excessively high temperatures are used, the degree of decomposition of the silicone fluid is too great and that the reaction product is too hard and may contain entrapped volatile decomposition products. It is therefore preferred to carry out the reaction at not over about 550° F. and still more preferably from about 450 to about 500° F.

It will be noted that the dehydration step in which the water and alcohol are removed from the clay and the reaction step can be carried out in one continuous heating cycle. However, it is important that all of the water and alcohol be removed before the reaction temperature is attained. In other words, the dehydration step should be conducted at temperatures below that at which chemical (including thermal) reaction occurs. The dehydration step is preferably carried out with agitation in order to facilitate heat transfer, however the reaction step is preferably carried out in a quiescent state. In carrying out the reaction in a quiescent state, it is preferred to spread the reactant mixture into relatively thin (ca. ½ inch) layers to facilitate even heating.

The following tests were performed to examine the effects of compositional and process variables on the character of the grease produced in this manner.

EXAMPLE II

Using the same general procedure as Example I, a number of high-temperature grease samples were prepared in which a wide range of copper sulfate and clay concentrations and various intervals of heating were observed with regard to their effect on mechanical and thermal stability and water resistance of the grease.

The following tests were used to assess thermal stability and water resistance:

*Thermal stability.—Thin film oxidation (TFO) test*

In this test a thin film of the grease is placed on a smooth flat plate which is heated in air at specified conditions of time and temperature. At selected intervals, the thermal stability is determined by measuring the weight loss of the sample and visually observing the texture of the grease.

*Thermal stability.—Bomb oxidation*

A fixed quantity of the grease is heated to 250° F. in the presence of oxygen in a sealed bomb. Oxidative stability is measured by observation of the pressure drop within the bomb at various intervals. Pressure drops of less than 5 p.s.i. at 100 hours or less than 15 p.s.i. at 500 hours are considered to be excellent.

*Water resistance.—Qualitative test*

A small amount of grease is smeared on the inside of a dry, clear glass beaker. The beaker is filled with water and then heated to boiling. Poor resistance to water is indicated by flaking off of the grease from the side of the beaker within less than about 10 minutes.

*Water resistance.—Water washout (ASTM test procedure D1264)*

In this test the grease is packed in a ball bearing which is inserted in a housing and rotated at about 600 r.p.m. with water of specified temperature impinging on the housed bearing. Water washout is measured by the amount of grease washed from the bearing in one hour.

TABLE I.—EFFECT OF COMPOSITION ON GREASE PROPERTIES

| | A | B | C | D | E | F | G | H | I | J |
|---|---|---|---|---|---|---|---|---|---|---|
| Composition of Ingredients, Percent by wt.: | | | | | | | | | | |
| $CuSO_4$ | 0.05 | 0.2 | 0.3 | 0.3 | 0.3 | 0.5 | 1.0 | 1.0 | 5.1 | 16.7 |
| Clay | 4.0 | 4.5 | 3.5 | 4.0 | 3.8 | 4.0 | 7.0 | 8.5 | 8.5 | 6.7 |
| DC-550 Silicone Oil | 95.95 | 95.3 | 96.2 | 95.7 | 95.9 | 95.5 | 92.0 | 90.5 | 86.4 | 76.6 |
| Heat Treatment: | | | | | | | | | | |
| Time, hrs | 15 | 2 | 2 | 22 | 22 | 22 | 3 | 4 | 4 | 4 |
| Temperature, °F | 450 | 450 | 500 | 450 | 450 | 450 | 450 | 450 | 450 | 450 |
| Mechanical Stability: | | | | | | | | | | |
| Penetration, dmm: | | | | | | | | | | |
| Unworked | 205 | 246 | 382 | 243 | 312 | 392 | 347 | | 336 | (¹) |
| Worked | | 263 | | | | 400 | 353 | | 362 | |
| Visual Rating | (²) | | | | | (³) | (³) | | (⁴) | (⁴) |
| Thermal Stability: | | | | | | | | | | |
| Thin Film Oxidation Test: | | | | | | | | | | |
| Temperature, °F | 450 | | 450 | 450 | 450 | 450 | | 450 | | |
| Time, hrs | 803 | | 93 | 880 | 400 | 400 | | 400 | | |
| Weight Loss, Percent | 29 | | 16 | 18.9 | 15.5 | 16 | | 12.7 | | |
| Appearance, Consistency | (⁵) | | | (³) | (⁶) | (⁷) | | (⁵) | | |
| Bomb Oxidation Test: | | | | | | | | | | |
| Temperature, °F | | | | 250 | | | | | | |
| Time, hrs | | | | 100/500/870 | | | | | | |
| Pressure Drop, p.s.i. | | | | 3/4/4 | | | | | | |
| Water Resistance: | | | | | | | | | | |
| Beaker Test | (⁸) | | (⁹) | (⁹) | (⁹) | | (⁹) | (⁹) | (³) | |
| ASTM D 1264, Washout, Percent wt | | | | 4.3 | | | | | | |

¹ Too soft. ² Putty-like. ³ Good. ⁴ Thixotropic. ⁵ Plastic. ⁶ Still plastic. ⁷ No change. ⁸ Fair. ⁹ Excellent.

The foregoing data show that the amount of time for which the grease is heat-treated in excess of about one hour is not important with regard to the properties of the resultant grease. Consequently, heat treatment for any time in excess of about one hour is sufficient. However, in order to assure more complete removal of volatiles from the grease, a heat treatment period of at least two hours is preferred.

The data in Table I also show that the amount of metal sulfate in the grease has a profound effect on the grease properties. As shown by sample A, to obtain adequate thermal stability and water resistance, at least about 0.1% by weight metal sulfate must be employed. On the other hand, as is shown by greases I and J in comparison with grease G, if the amount of metal sulfate exceeds about 4% by weight, the resultant grease has poor mechanical stability and is thixotropic. Superior properties are obtained when the amount of sulfate is within the preferred range of from about 0.2 to about 1.0% by weight.

Particularly noteworthy about all of the above greases, which are within the 0.1–4% metal sulfate range, is their outstanding oxidation stability, thermal stability and resistance to water, and especially the second of these.

It has also been found that the silicone oil plays an important part in achieving the desired properties of the greases, as is shown by the following example.

EXAMPLE III

Using the same procedure as Example I, three greases were prepared and tested from silicone oils of different methyl-to-phenyl ratio. Each was prepared from 0.3% wt. $CuSO_4$ and 4.0% wt. clay and was heat-treated at 450° F. for 20–22 hours. The results were as follows:

TABLE II.—EFFECT OF METHYL/PHENYL MOLE RATIO IN SILICONE OIL

| Methyl/Phenyl Mole Ratio | Water Resistance | Thermal Stability | |
|---|---|---|---|
| 0.8:1 | Excellent | Fair | Finished grease too hard. |
| 2.8:1 | do | Excellent | Good grease consistency. |
| 6.0:1 | Poor | | Excessive volatilization during heat treatment before satisfactory grease consistency obtained. |

From the above data, it appears that the high (6.0:1) methyl-phenyl silicone oil was thermally too unstable to be practicable for making the grease composition of the invention and gave unsatisfactory water resistance. On the other hand, the low (0.8:1) methyl-phenyl silicone oil yielded a finished grease having only fair thermal stability and was of too hard consistency. It is therefore preferred to employ for the invention methyl-phenyl silicone blends in which the mole ratio of methyl-to-phenyl groups is from about 1:1 to about 5:1 and still more preferably from about 1.5 to about 3.5.

In addition to copper sulfate, it has also been found that iron, cobalt and nickel sulfates and mixtures of sulfates of iron, cobalt, nickel or copper may be used as well. This is illustrated by the following examples:

EXAMPLE IV

A grease composition was prepared by the same general procedure of Example I except that nickel sulfate ($NiSO_4$) was used instead of copper sulfate. A 3½ hour heat treatment at 450° F. was used in carrying out the reaction of the ingredients. The ingredients were used in the weight proportions of 4% clay, 0.3% nickel sulfate and 95.7% DC–550 silicone oil. The resultant milled grease had excellent resistance to boiling water by the aforementioned beaker test and high-temperature stability in that a weight loss of only 15.7% was obtained after 164 hours in a Thin Film Oxidation Test of the grease at 450° F.

EXAMPLE V

The following are examples of other formulations which may be used to make highly heat-stable greases in accordance with the procedure of the invention.

(A)

| | Percent by wt. |
|---|---|
| Bentonite clay | 3.0 |
| Ferrous sulfate | 0.4 |
| DC–550 silicone oil | 96.6 |

(B)

| | |
|---|---|
| Hectorite clay | 8.0 |
| Cobalt sulfate | 0.3 |
| DC–710 silicone oil | 91.7 |

(C)

| | |
|---|---|
| Hectorite clay | 4.0 |
| Copper sulfate | 0.2 |
| Ferrous sulfate | 0.2 |
| DC–550 silicone oil | 95.6 |

(D)

| | |
|---|---|
| Hectorite clay | 4.0 |
| Ferric sulfate | 0.4 |
| DC–550 silicone oil | 95.6 |

While the four metals having atomic numbers of from 26 to 29 may be used in the invention, apparently only the sulfate form of such metals can be used to make a satisfactory thermally stable grease, which is illustrated by the following example.

EXAMPLE VI

Formulation:

| | Percent by wt. |
|---|---|
| Hectorite clay | 4.0 |
| Copper acetate | 0.3 |
| Silicone oil | 95.7 |

When the above ingredients were processed in accordance with the process of Example I, only about 2% by weight of the silicone oil was volatilized. The resultant product was a semi-liquid and did not form a grease structure on milling.

EXAMPLE VII

Formulation:

| | Percent by wt. |
|---|---|
| Hectorite clay | 4.0 |
| $Cu_3(PO_4)_2 \cdot 3H_2O$ | 10.0 |
| DC–550 silicone oil | 86.0 |

When the above ingredients were processed in accordance with the procedure of Example I, about 26% by weight of the silicone oil was volatilized. However, the resultant product was rubbery and therefore inadequate for grease applications.

It will, of course, be recognized that, in view of the fact that the metal salts are added to an aqueous clay slurry in the process of making the grease composition of the invention, either the anhydrous or hydrated form of such salts may be used with equally good results. It is, however, preferred that they be fully dissolved in the slurry prior to addition of the silicone oil.

It is not known with certainty what reactions take place among the clay, metal sulfate and silicone. From the evolution of vapors and change in color, it is clear that the silicone oil undergoes chemical change. Moreover, it does not appear that the metal sulfate undergoes any reaction at the conditions employed here, though it clearly must be present for the desired reactions with the silicone fluid to occur. Consequently, it is as yet impossible to define the composition of the greases of the invention except by their formulation and the important process conditions which have been observed to be necessary to obtain the correct degree of reaction.

The superior high-temperature stability of the grease composition of the invention are perhaps best illustrated by their comparison with the indanthrene-thickened greases, which are, of course, widely accepted and used because of their high-temperature stability.

EXAMPLE VIII

| Formulations: | Percent by wt. |
|---|---|
| Hectorite clay | 3.5 |
| Copper sulfate | 0.3 |
| Indanthrene blue | 30 |
| DC-550 silicone oil | 96.2 |
| DC-550 silicone oil | 70 |

Both the grease of the invention and the indanthrene grease were subjected to a Thin Film Oxidation Test for a period of 40 hours at 700° F. The indanthrene grease incurred a weight loss of 97.2%, leaving only a thin ash on the smooth plate. The grease made in accordance with the invention, however, incurred a weight loss of only 37.4%. Though hardened somewhat, it was nevertheless still plastic and had suitable grease structure.

I claim as my invention:

1. A grease composition having improved thermal stability consisting essentially of the reaction product obtained (a) by heating a mixture of 2.5–12% by weight expanded clay and 0.1–4% by weight of at least one sulfate of a metal having an atomic number of from 26 to 29 inclusively with 84.0–97.4% by weight of a methyl-phenyl polysiloxane oil at a temperature of 400–550° F. for a period of at least one hour and (b) by milling said reaction mixture.

2. The composition of claim 1 in which the methyl-to-phenyl mole ratio of the polysiloxane oil is from about 1:1 to about 5:1.

3. The composition of claim 1 in which the amount of metal sulfate is 0.2–1.0% by weight.

4. The composition of claim 1 in which the metal sulfate is copper sulfate.

5. The composition of claim 1 in which the metal sulfate is nickel sulfate.

6. The composition of claim 1 in which the sulfate component of the mixture of expanded clay, metal sulfate and polysiloxane consists of a mixture of at least two sulfates of metals having an atomic number of from 26 to 29 inclusively.

7. A process for the preparation of thermally stable grease comprising the steps:
 (1) admixing (a) at least one sulfate of a metal having an atomic number of from 26 to 29, inclusively, (b) a methyl-phenyl polysiloxane oil and (c) isopropyl alcohol with an aqueous slurry of expanded clay, the weight of alcohol being at least seven times as great as the weight of water in the aqueous slurry;
 (2) heating the admixture to a temperature of at least 212° F. for a time sufficient to remove essentially all the water and alcohol by evaporation the proportion of components in the dehydrated admixture being within the following limits:

| | Percent by wt. |
|---|---|
| Clay | 2.5–12 |
| Metal sulfate | 0.1–4 |
| Polysiloxane oil | 84.0–97.4 |

(3) reacting the dehydrated admixture at a temperature of 400–550° F. for a period of at least one hour; and
 (4) milling the thus-reacted admixture to form a grease.

8. The process of claim 7 in which the polysiloxane oil is added to the aqueous slurry after at least partial dehydration of the slurry but before essentially complete removal of the alcohol.

9. The process of claim 7 in which the dehydration step (2) is carried out at a temperature of at least 250° F.

10. The process of claim 7 in which the reaction of the dehydrated admixture is carried out at a temperature of 450–500° F.

References Cited by the Examiner

FOREIGN PATENTS 545,523    8/1957    Canada.

OTHER REFERENCES

"Manufacture and Application of Lubricating Greases," by Boner, 1954, Reinhold Pub. Corp., New York, p. 761 (Copy in Sci. Libr.).

DANIEL E. WYMAN, *Primary Examiner.*

I. VAUGHN, *Assistant Examiner.*